United States Patent
Hsu et al.

(10) Patent No.: US 6,839,845 B2
(45) Date of Patent: Jan. 4, 2005

(54) CONTROL SYSTEM FOR IMAGE INPUT DEVICE, ESPECIALLY FINGERPRINT IMAGE INPUT DEVICE

(75) Inventors: Wen-Hsing Hsu, Hsinchu (TW); Chap-Meng Bee, Hsinchu (TW)

(73) Assignee: Startek Engineering Incorporated, Hsinchu (TW)

( * ) Notice: Subject to any disclaimer, the term of this patent is extended or adjusted under 35 U.S.C. 154(b) by 912 days.

(21) Appl. No.: 09/776,668

(22) Filed: Feb. 6, 2001

(65) Prior Publication Data

US 2002/0108047 A1 Aug. 8, 2002

(51) Int. Cl.$^7$ .............................. G06F 9/00; G06K 9/00
(52) U.S. Cl. ............................ 713/186; 382/4; 382/124
(58) Field of Search ................................. 713/186, 185; 382/4, 124

(56) References Cited

U.S. PATENT DOCUMENTS

| | | | | |
|---|---|---|---|---|
| 5,067,162 A | * | 11/1991 | Driscoll et al. | 382/126 |
| 5,267,324 A | * | 11/1993 | Kumagai | 382/127 |
| 5,467,403 A | * | 11/1995 | Fishbine et al. | 382/116 |
| 5,796,857 A | * | 8/1998 | Hara | 382/124 |
| 2004/0131237 A1 | * | 7/2004 | Machida | 382/124 |

FOREIGN PATENT DOCUMENTS

GB     EP0 973123 A1 *  1/2000  ........... G06K/11/18

\* cited by examiner

*Primary Examiner*—Norman M. Wright
(74) *Attorney, Agent, or Firm*—Bacon & Thomas PLLC

(57) ABSTRACT

A novel control system for image input device, especially fingerprint image input device, is disclosed. The control system comprises a fingerprint image input device selection module, an instruction conversion module and a fingerprint image size determination module. The fingerprint image input device selection module selects a particular fingerprint image input device from a variety of fingerprint image input devices. The instruction conversion module generates, upon an image capture instruction or a match instruction from a fingerprint verification software, particular image capture instructions to a the selected fingerprint image input device, wherein the instruction pertains to a specification of image as selected by a user or determined with a particular method. The fingerprint image size determination module determines the specification, including the resolution and the size of fingerprint image to be captured. The fingerprint image input device then capture a fingerprint image according to the instruction, under the selected or designated specification. This invention also discloses a method to determine a basic point and to capture a fingerprint image within an area based on the basic point.

4 Claims, 1 Drawing Sheet

CONTROL SYSTEM FOR IMAGE INPUT DEVICE, ESPECIALLY FINGERPRINT IMAGE INPUT DEVICE

FIELD OF INVENTION

The present invention relates to a control system for image input device, especially to a control system for fingerprint image input device. The present invention provides a control system to control fingerprint image input devices of a variety of brands and models.

BACKGROUND OF INVENTION

The verification of fingerprint has become an important way in the identification of a person. With the help of the computerized fingerprint verification technology, a great number of persons may be identified within a short time. In order to verify fingerprints in the computer system, an image input device is provided to input digitized images of fingerprints to the computer system. In the conventional art, input devices for fingerprint images included: dot scanner, line scanner, LCD camera, CMOS sensor, chip fingerprint sensor etc. Digitized images input by these input devices may be stored in the memory devices of a computer system for further processing, such as matching with an enrolled fingerprint data file.

The verification of a fingerprint pertains to matching the fingerprint with an enrolled fingerprint. In the known art, the object to be matched is a data file representing a fingerprint. If the data file to be matched is the fingerprint image itself, the file contains data representing black-and-white or gray leveled image data of a fingerprint, within a predetermined area. In the file, the lines and the grooves of the fingerprint are represented by pixels with different gray levels respectively. Addresses of the pixels are represented by their respective rectangular coordinates. In other approaches, in the data file stored are equations representing curved lines of a fingerprint or coordinates of feature points of a fingerprint.

Fingerprint verification systems that are already made available to the world are developed on their respective platforms. Among them, each system has its particular way of verification and matching. Requirements and specifications of fingerprint images or fingerprint data are different from system to system. Generally speaking, verification of total image file of fingerprints is the most basic but time consuming approach. This approach is not used in any commercially available system. A standard approach of verification is the matching of feature points of fingerprints. Fingerprint verification system developed based on such an approach is relatively practicable. In addition, verification of fingerprints according to distribution of feature points, referenced by other features of the fingerprint, was disclosed by some inventors. Verification of fingerprints according to the similarity of curved lines of the fingerprint has also been suggested. No matter how a fingerprint is verified, the fingerprint image shall be pre-processed to comply with the requirements of the verification after it is input to the verification system through a fingerprint image input device. This step is after all necessary in every fingerprint verification system.

Due to the differences in the specification and requirements of fingerprint images for the fingerprint verification system, the design and specification of output data of their corresponding fingerprint image input devices are different from device to device. As described above, fingerprint image input devices used to input fingerprint images include: image sensor, line scanner, planar scanner, contact image sensor, CMOS sensor, chip sensor etc. Among them, image sensor, line scanner, planar scanner, CMOS sensor and contact image sensor are optical image input devices, in which the contact image sensor is a sensor where light source and image sensor are combined as one element. The chip sensor is an electronic sensor which, according to the distribution of capacitances and electric fields, obtains the topographic image data of a fingerprint. It is believed that other fingerprint image input devices may be developed, based on the above and other theories and used as input device for fingerprint in the near future.

In the existing and the future fingerprint image input devices, the differences in the required specification of the fingerprint image data rest in the resolution and the size of the input fingerprint image. The resolution of a fingerprint is represented by dpi (dot per inch), which indicates the most number of pixels existing within one inch. The resolution of the fingerprint image input devices includes 100, 200, 300, 400, 500, 600 and 1,000 or above. As to the size of the image, although most fingerprint image input devices provides a fingerprint image sized at 1 square inch, fingerprint images with greater or smaller sizes may also be provided. In addition, other features of the fingerprint data may also be required or provided. The above and other differences in requirements, specifications and features of the input fingerprint images make it difficult in the development of the fingerprint verification system.

The problems that have been discovered include that each type or model of the fingerprint image input devices needs a particular driving system. As a result, developers of fingerprint verification and application systems have to develop particular systems for respective fingerprint image input devices. From the viewpoint of the developers, such a requirement means a waste of resources.

In addition, as new fingerprint image input devices are developed, it is difficult for system developers to predict the specifications of future fingerprint image input devices. The fingerprint verification and application systems can only be applied in the existing fingerprint image input devices.

It is thus necessary to provide a control system for fingerprint image input device that may be applied to a variety of fingerprint image input devices.

It is also necessary to provide a novel control system for fingerprint image input device that may be applied to newly developed fingerprint image input devices.

OBJECTIVES OF INVENTION

The objective of this invention is to provide a control system for fingerprint image input device that may be applied to a variety of fingerprint image input devices.

Another objective of this invention is to provide a novel control system for fingerprint image input device that may be applied to newly developed fingerprint image input devices.

SUMMARY OF INVENTION

According to this invention, a novel control system for image input device, especially fingerprint image input device, is disclosed. The control system comprises a fingerprint image input device selection module, an instruction conversion module and a fingerprint image size determination module. The fingerprint image input device selection module selects a particular fingerprint image input device from a variety of fingerprint image input devices. The instruction conversion module generates, upon an image capture instruction or a match instruction from a fingerprint verification software, particular image capture instructions to a the selected fingerprint image input device, wherein the instruction pertains to a specification of image as selected by a user or determined with a particular method. The fingerprint image size determination module determines the specification, including the resolution and the size of fingerprint image to be captured. The fingerprint image input device then capture a fingerprint image according to the instruction, under the selected or designated specification. This invention also discloses a method to determine a basic point and to capture a fingerprint image within an area based on the basic point.

The above and other objectives and advantages of this invention may be clearly understood from the detailed description by referring to the following drawings.

DETAILED DESCRIPTION OF INVENTION

Figure 1:
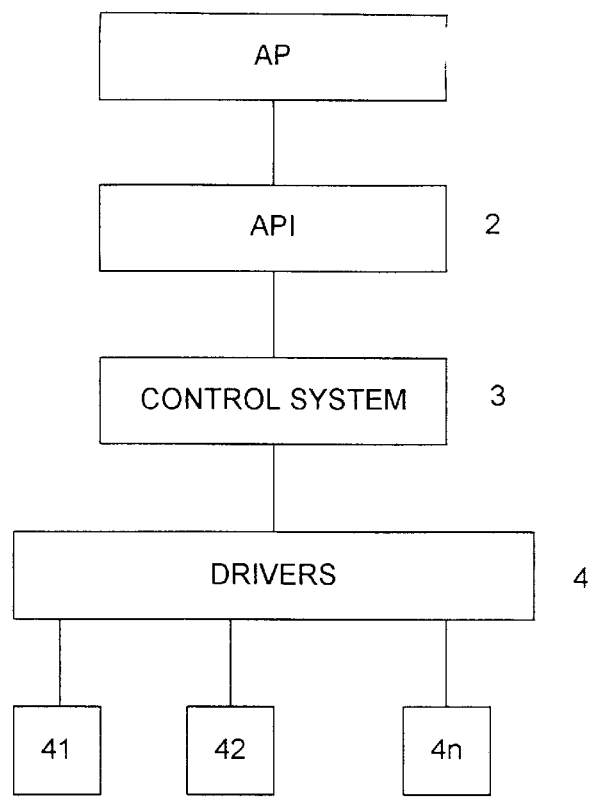
FIG. 1 illustrates the system diagram of an application system for the control system for image input device, especially fingerprint image input device, of this invention.

The following is a detailed description of the control system for image input device, especially fingerprint image input device, of this invention. FIG. 1 illustrates the system diagram of an application system for the control system for image input device, especially fingerprint image input device, of this invention. As shown in this figure, a fingerprint verification system may be divided into levels. In the levels, the upper most level is an application program 1 for the fingerprint verification system. Under this upper level 1 is an interface level 2 for the application program. The interface level 2 in general comprises a plurality of instructions that may be called by the application program 1, such as "capture image", "verify" and other function modules, and particular hardware coordination modules (?). The bottom level of the fingerprint verification system is the driving programs 4 for fingerprint image input devices. In this invention, the fingerprint verification system is applicable to a variety of fingerprint image input devices. As a result, in the bottom level 4 are already installed a series of driving programs 41, 42, . . . , 4n, corresponding to known fingerprint image input devices.

Also in this invention, the control system 3 for fingerprint input device is the interface level between the interface module 2 and the driving programs 41, 42, . . . , 4n. In the control system 3 instructions that may be called by the interface level 2 are stored. Also stored in this control system 3 is a look-up-table of instructions that may be called by the interface level 2 and instructions that may be used in the driving programs of the available fingerprint image input devices. As a result, when a user selects an applicable fingerprint image input device, capture and verification of fingerprints may be actuated by the application program 1 at the upper most level.

Figure 2:
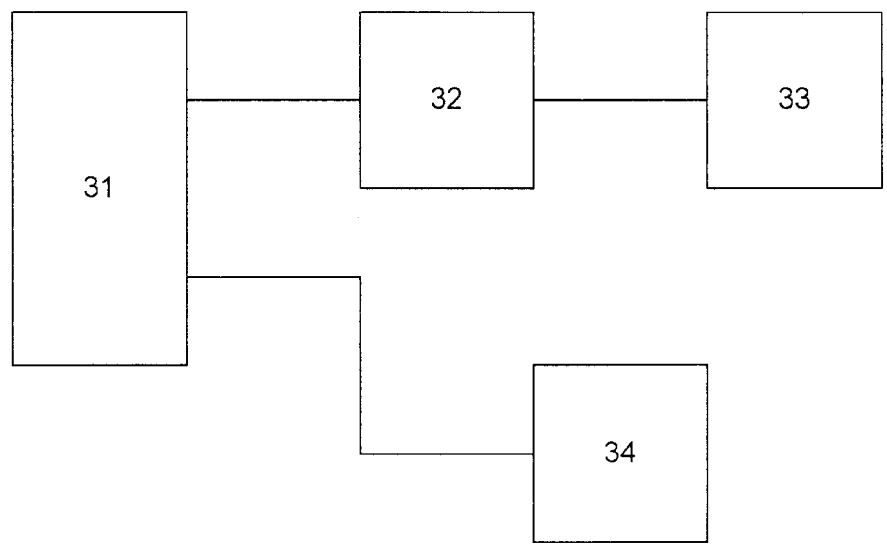
FIG. 2 illustrates the block diagram of the control system for image input device, especially fingerprint image input device, of this invention.

The structure of the control system for image input device, especially fingerprint image input device, of this invention will be described hereinafter. FIG. 2 illustrates the block diagram of the control system for image input device, especially fingerprint image input device, of this invention. As shown in this figure, the control system for image input device, especially fingerprint image input device, of this invention comprises a fingerprint image input device selection module 31, an instruction conversion module 32, an instruction look-up-table 33 and a fingerprint image size determination module 34.

The operation of the control system for image input device, especially fingerprint image input device, of this invention may be as follows. When the control system for image input device, especially fingerprint image input device, of this invention is operated, at first the fingerprint image input device selection module 31 is operated. The basic function of this module 31 is to select a set of communication protocol applicable to a particular model of fingerprint image input device and to establish a communication with said fingerprint image input device.

In this module 31, codes representing respective available fingerprint image input devices are installed. In the embodiment of this invention, a user interface program is provided in this module 31, such that a user may select in the screen display of this module 31 and select an available fingerprint image input device from the screen. Upon such a selection, the code representing the selected fingerprint image input device is generated and recorded for further use. In another embodiment of thin invention, an automatic negotiation procedure is operated upon the operation of the fingerprint image input device selection module 31, such that the system detects the online fingerprint image input device and record its code automatically. Of course, in the latter approach, if a plurality of fingerprint image input devices are provided, the user is required to select one from them.

After a fingerprint image input device is called, the user will call the applicable driving program of the selected fingerprint image input device from the application program 1. The call is first forwarded to the interface level 2 of the application program 1 to determined whether the call is an effective call. If the call is and effective instruction, the instruction will be forwarded to the control program to be executed. When the call is a "capture image" call, its instruction will include three steps, as follows:

"Connect",

"Get image" and

"Disconnect".

As this step, the instruction conversion module 32 will check whether a fingerprint image input device is already selected. If not, the fingerprint image input device selection module 31 will be called. Otherwise, the driving program for the selected fingerprint image input device will be allocated from the instruction look-up-table 33 and is operated. Through such an operation, the fingerprint verification program of the system may be used to drive the online or provided fingerprint image input device directly. Capture or other operations of fingerprints may be conducted by the application software, without being limited to any particular model or type of image input device.

Under the above-described method, a fingerprint image may be obtained for verification or other processes. However, adjustments to the specification of the fingerprint are still necessary, since the resolution and size of image captured by the fingerprint image input devices are different from model to model and from type to type. In the present invention, such adjustments are operated by the fingerprint image input device selection module 31.

For example, when the resolution required by the fingerprint verification and application system is 500 dpi and the resolution of the selected fingerprint input device is 250 dpi, interpolation between pixels of the captured fingerprint image may be conducted to comply with such a requirement. Of course, the interpolation may also be operated in the application program 1. As to the interpolation, several approaches have been developed and known to those skilled in the art. Detailed description thereof is thus omitted. On the other hand, if the resolution of the selected fingerprint image input device is 1,000 dpi, down-sampling may be operated in the fingerprint image input device selection module 31. Again, the method for the down-sampling is known to those skilled in the art. Detailed description thereof is thus omitted.

In this invention, a fingerprint image size determination module 34 is provided. In general, the size of captured fingerprint image for most fingerprint image input devices is under 1 square inch. Size of fingerprint image to be processed in a fingerprint verification and application system is always under 0.5 square inch.

In the determination of the area of fingerprint image to be processed, a basic point around which feature points of a captured fingerprint image may be allocated by using a known technology, such as that disclosed in U.S. Pat. No. 5,960,112. The fingerprint image size determination module 34 determines an area surrounding the basic point. Such an operation may be conducted by selecting each 128 pixels up, down, left and right to the basic point (when the resolution is 500 dpi) and the selected image is deemed the captured fingerprint image. Of course, although a fingerprint image containing 256*256 pixels is a standard unit, other sizes, such as 200*200, 224**224 etc.) may also applicable, as long as the size and resolution meets the requirements of the fingerprint verification and application system.

When the basic point locates at or adjacent to the border of the fingerprint image, it is not possible to obtain a fingerprint image with sufficient effective size or pixels. However, whether the obtained fingerprint image is effective is determined by the application system. If the image is not effective, capture of the fingerprint image may be operated again. Notable is that it is possible to obtain a fingerprint image that is suited to the application software through the above-described adjustments.

EFFECTS OF INVENTION

As described above, in the control system for image input device, especially fingerprint image input device, of this invention, a fingerprint verification system may be applicable to a variety of fingerprint image input devices without the need to be equipped with a variety of interfacing programs corresponding to the fingerprint input devices. Capture and verification of fingerprint may thus be easily operated.

In addition, due to the adjustment of resolution and size of captured fingerprint images, it is possible to obtain fingerprint images with standard specifications. If a remote fingerprint image input device is used, it is possible to conduct online fingerprint verification applications by using a local server.

Nevertheless, the control system for image input device, especially fingerprint image input device, of this invention may be applied to an unknown fingerprint image input device by adjusting the resolution and size of fingerprint images to be captured. In doing so, simply providing a dialog panel enabling users to input resolution and size of captured fingerprint images and other relative factors or instructions may result at such an effect.

As the present invention has been shown and described with reference to preferred embodiments thereof, those skilled in the art will recognize that the above and other changes may be made therein without departing form the spirit and scope of the invention.

What is claimed is:

1. A control system for fingerprint image input device, comprising:

a fingerprint image input device selection module, to select a set of communication protocol applicable to a particular model of fingerprint image input device and to establish a communication with said fingerprint image input device;

an instruction conversion module, to convert an fingerprint image input device control instruction into a control instruction applicable to said fingerprint image input device;

a fingerprint image size determination module, to determine specification of fingerprint image to be input by said fingerprint image input device; said specification including resolution and number of pixels of said fingerprint image; and a user interface to enable a user to input at least said control instruction.

2. The control system for fingerprint image input device according to claim 1 wherein said instruction conversion module comprises a look-up-table of instructions for said fingerprint image input device.

3. The control system for fingerprint image input device according to claim 1 wherein said fingerprint image input device selection module comprises a means to automatically detect an online fingerprint image input device.

4. The control system for fingerprint image input device according to claim 1 wherein said fingerprint image size determination module further comprises a means to allocate a basic point of a captured fingerprint image wherein said basic point locates at center of an area wherein most feature points of said fingerprint image locate.

* * * * *